(12) United States Patent
Liu et al.

(10) Patent No.: US 8,503,122 B2
(45) Date of Patent: Aug. 6, 2013

(54) LIGHT CONTROL FILM AND MULTI-LAYER OPTICAL FILM STACK

(75) Inventors: YuFeng Liu, Woodbury, MN (US); Michael E. Lauters, Hudson, WI (US); Ade Babatunde, Greenville, SC (US)

(73) Assignee: 3M Innovative Properties Company, St. Paul, MN (US)

( * ) Notice: Subject to any disclaimer, the term of this patent is extended or adjusted under 35 U.S.C. 154(b) by 692 days.

(21) Appl. No.: 12/696,484

(22) Filed: Jan. 29, 2010

(65) Prior Publication Data

US 2010/0201242 A1    Aug. 12, 2010

Related U.S. Application Data

(60) Provisional application No. 61/150,502, filed on Feb. 6, 2009.

(51) Int. Cl.
*G02B 5/22* (2006.01)

(52) U.S. Cl.
USPC .......................................... 359/885; 359/580

(58) Field of Classification Search
None
See application file for complete search history.

(56) References Cited

U.S. PATENT DOCUMENTS

| | | | |
|---|---|---|---|
| RE27,617 E | 4/1973 | Olsen | |
| 5,204,160 A | 4/1993 | Rouser | |
| 5,254,388 A | 10/1993 | Melby et al. | |
| 5,825,436 A | 10/1998 | Knight | |
| 5,882,774 A | 3/1999 | Jonza | |
| 6,368,699 B1 | 4/2002 | Gilbert | |
| 6,398,370 B1 | 6/2002 | Chin | |
| 6,531,230 B1 | 3/2003 | Weber | |
| 6,534,158 B2 * | 3/2003 | Huang et al. | 428/201 |
| 7,018,713 B2 | 3/2006 | Padiyath | |
| 7,094,461 B2 | 8/2006 | Ruff | |
| 7,140,741 B2 | 11/2006 | Fleming | |
| 7,256,936 B2 | 8/2007 | Hebrink | |
| 7,486,019 B2 | 2/2009 | Padiyath | |
| 2002/0112384 A1 | 8/2002 | Huang et al. | |
| 2007/0160811 A1 | 7/2007 | Gaides | |
| 2008/0186558 A1 | 8/2008 | Lee | |
| 2009/0323180 A1 | 12/2009 | Weber | |

FOREIGN PATENT DOCUMENTS

| | | |
|---|---|---|
| CA | 2098833 | 2/2002 |
| WO | WO 2007/100458 | 9/2007 |
| WO | WO 2007/118122 | 10/2007 |
| WO | WO 2008/085889 | 7/2008 |
| WO | 2008/144636 | 11/2008 |
| WO | 2008/144644 | 11/2008 |
| WO | 2009/085581 | 7/2009 |
| WO | WO 2010/090924 | 8/2010 |
| WO | 2010/148082 | 12/2010 |

OTHER PUBLICATIONS

U.S. Appl. No. 61/615,378 to Lauters et al., filed Mar. 26, 2012, entitled *Light Control Film and P-Polarization Multi-Layer Film Optical Film Stack*.
U.S. Appl. No. 29/416,648 to Lauters et al., filed Mar. 26, 2012, entitled *Privacy Filter for an Illuminated Display Device*.
Comparative A , "3M Gold Privacy Filter", has been commercially available for more than 1 year, 2012.

* cited by examiner

*Primary Examiner* — Arnel C Lavarias
(74) *Attorney, Agent, or Firm* — Kristofor L. Storvick

(57) ABSTRACT

Film stacks and displays incorporating the same are described. More specifically film stacks that combine a light control film and a color shifting film proximate to one another and, in some embodiments, adhered together are described, as well as displays incorporating such film stacks. Such film stacks may combine the "blacking out" functionality of a conventional louver film (LCF) and the color shifting effect of a multilayer optical film (MOF).

19 Claims, 1 Drawing Sheet

LIGHT CONTROL FILM AND MULTI-LAYER OPTICAL FILM STACK

CROSS-REFERENCE TO RELATED APPLICATION

This application claims the benefit of U.S. Provisional Patent Application No. 61/150,502, filed Feb. 6, 2009.

FIELD OF THE INVENTION

The present invention generally relates to a film stack having a light control film and a color shifting film. The present invention also relates to displays incorporating the same.

BACKGROUND

Light control film (LCF), also known as light collimating film, is an optical film that is configured to regulate the directionality of transmitted light. Various LCFs are known, and typically include a light transmissive film having a plurality of parallel grooves wherein the grooves are formed of a light absorbing material. Depending on the orientation of the grooves, the pitch, and the geometry of the grooves (e.g., the side-wall angle), the LCF may provide for maximum transmission at a predetermined angle of incidence with respect to the image plane and provide for image cut-off or black-out along a given polar coordinate (e.g., horizontally in the case of so-called privacy filters, or vertically when such light control films are integrated into instrument panel displays for automobiles).

LCFs may be placed proximate a display surface, image surface, or other surface to be viewed. Typically, LCFs are designed such that at normal incidence, (i.e., 0 degree viewing angle, when a viewer is looking at an image through the LCF in a direction that is perpendicular to the film surface and image plane), the image is viewable. As the viewing angle increases, the amount of light transmitted through the LCF decreases until a viewing cutoff angle is reached where substantially all the light is blocked by the light-absorbing material and the image is no longer viewable. When used as a so-called privacy filter (for instance, for liquid crystal displays in computer monitors or laptop displays), this characteristic of LCFs can provide privacy to a viewer by blocking observation by others that are outside a typical range of viewing angles.

LCFs can be prepared, for instance, by molding and ultraviolet curing a polymerizable resin on a polycarbonate substrate. Such LCFs are commercially available from 3M Company, St. Paul, Minn., under the trade designation "3M™ Filters for Notebook Computers and LCD Monitors".

SUMMARY

In one aspect, the present description relates to a film stack having a light control film and a color shifting film proximate to one another.

In another aspect, the present description relates to a film stack having a light control film and a color shifting film with an adhesive layer placed between them.

In a third aspect, the present invention relates to a display device having a display surface that emits image light and a film stack. The film stack and display surface are arranged such that at least some of the image light travels through the film stack. The film stack has a light control film and a color shifting film proximate to one another.

DETAILED DESCRIPTION

Advances in display technology have resulted in brighter, higher resolution, and more energy efficient displays. The brightness and resolution of a display can be reduced, however, when an LCF is positioned in front of the display (e.g., for security purposes or as a contrast enhancement film). It would be desirable to have a privacy solution that, when used in combination with a display, has a higher light transmission and display resolution. At the same time, display users that value the privacy of their information desire a solution that does not compromise that privacy.

Recent advances to LCF films include modification of the groove structure and geometry to enhance the light transmission through the light control film. There is continuous need, however, to enhance the privacy or field of view of such LCF while keeping transmission high. It would further be desirable to provide a non-informational colorful and vivid look to an electronic device's display area for off-axis viewers rather than the heretofore known "black out" privacy view. The present description fulfills these and other needs, and offers other advantages.

The present application is directed to a film stack combining a light control film (LCF) and a color shifting film proximate to one another and, in some embodiments, adhered together. Commonly, privacy filters are composed of a stand alone LCF. The film stack described herein with its combination of LCF and color shifting film proximate to the LCF, each serving a different function, may be seen as a "hybrid" privacy filter. In particular, the hybrid privacy filter combines what can be called the "blacking out" functionality of a conventional louver film (LCF) and the color shifting effect of a multilayer optical film (MOF).

Figure 2:
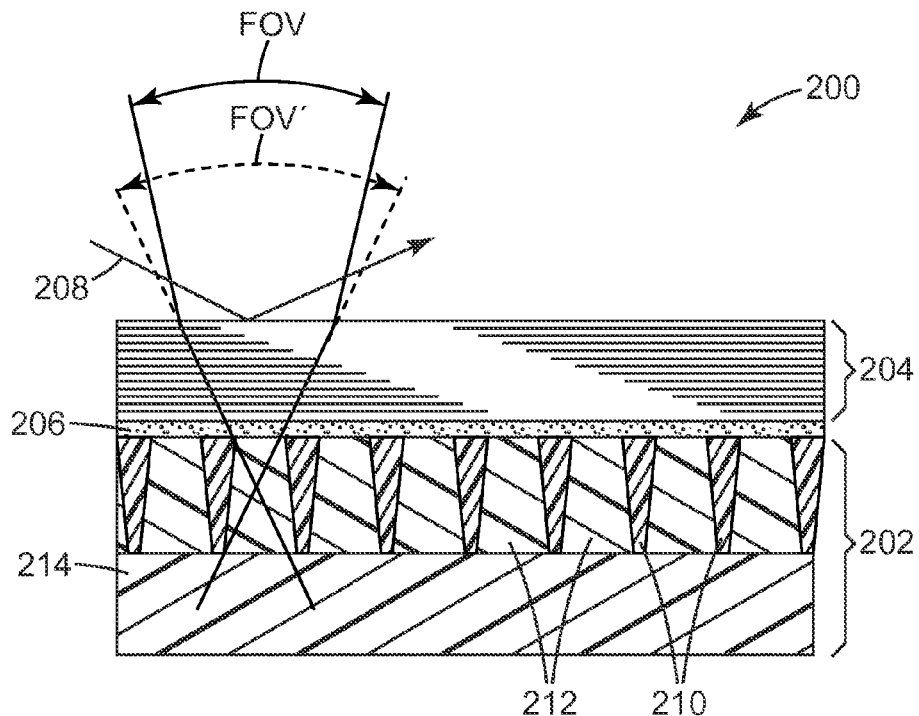
FIG. 2 is a cross-sectional view of a film stack according to one embodiment of the present description.

One embodiment of the film stack described herein is illustrated in FIG. 2. The film stack 200, as shown, is composed of an LCF 202 and an MOF 204 adhered together by an adhesive layer 206. The LCF in FIG. 2 is composed in part of transmissive regions 212 and non-transmissive regions 210 which alternate across the width of the film. The transmissive and non-transmissive regions in this embodiment are built upon a base substrate 214, which is a further component of the LCF. FIG. 2 is especially useful in showing the reduced cut-off angle, and therefore heightened privacy, created as a result of the film stack (as opposed to an LCF alone), in part due to the ambient light 208 reflection off of the MOF 204.

A hybrid privacy filter utilizing an LCF (e.g., element 202 in FIG. 2) and an MOF (e.g., element 204 in FIG. 2) has a better defined effective viewing angle cut-off and privacy function than either the LCF or MOF alone. At the same time, the hybrid privacy filter still maintains a high level of transmission that is comparable to a stand alone light control film (for instance, axial transmission).

For simplification, it will be discussed herein the effect that certain films or film stacks have on "on-axis" transmission. Those skilled in the art will readily recognize that the desired axis of transmission may be chosen by designing the geometry of the louvers in an LCF. While in many embodiments, for instance, privacy films, on-axis transmission is perpendicular to the surface of the display image plane, it will be readily understood that for applications wherein a viewer is not typically situated perpendicular to the display image plane, a non-normal viewing axis may be desirable.

There is no substantial decrease in on-axis light transmission for a film stack including an MOF and an LCF visa vis the LCF alone when used as a privacy filter over top of a display. In some embodiments of the present description, an MOF may be designed to be highly transparent with low reflection and low absorption for light incident at angles that are inside the viewing angle of the LCF.

Reflection of ambient light from the MOF may begin to occur at angles close to or even equal to the cut-off angle of the LCF. The combination of the light blocking properties of the LCF in decreasing the image light transmitted through the film stack and the onset of glare reflection from the MOF from ambient light, can serve to provide a well-defined cut-off angle for privacy filters made from film stacks described herein. The combination of the LCF's ability to block transmission of the display light (typically by absorption) and the MOF's ability to create bright reflections inhibit off-axis viewers from viewing the display content.

Figure 1:
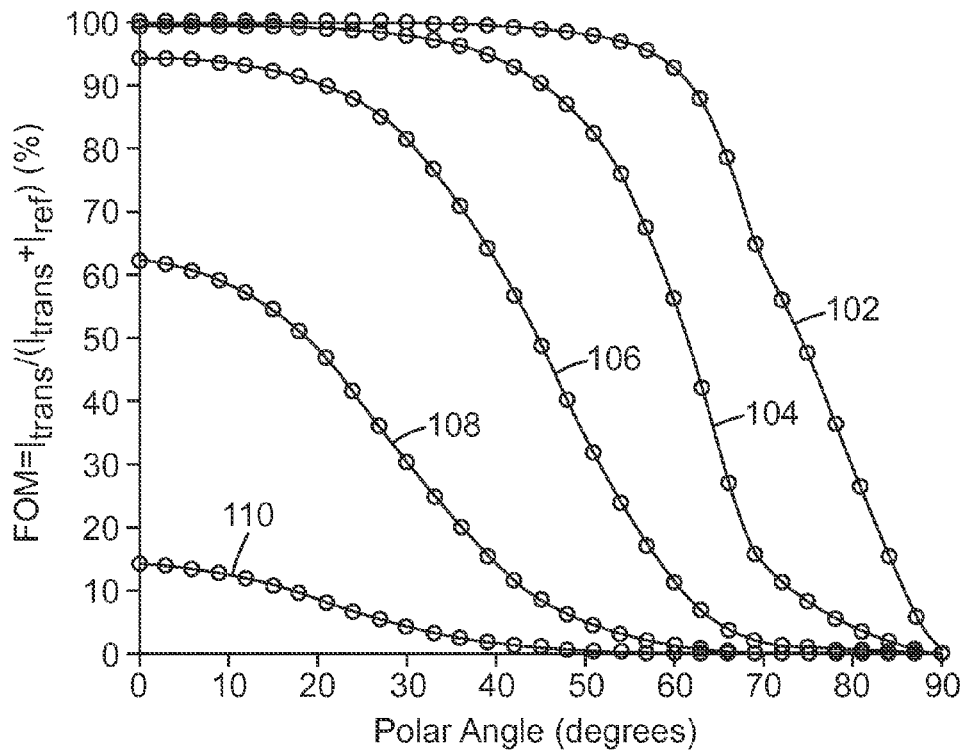
FIG. 1 is a Graph displaying Figure of Merit as a function of incident (polar) angle and the ratio of ambient to display intensity for a color shifting film used in the current invention.

FIG. 1 provides a valuable illustration of how a color shifting film (in this instance, an MOF) may be used in the film stack described herein behaves when exposed to various relative levels of ambient light.

In a typical lighting condition such as an office or in an airplane with its cabin's lights on, the ambient light is about the same intensity as the display ($I_{amb} \sim I_{disp}$). When a display is used outdoors, the ambient light is about 10 times the intensity as the display ($I_{amb} \sim 10 * I_{disp}$).

At large polar angles an MOF reflects larger amounts of ambient light while transmitting lesser amounts of light. This effect is illustrated in FIG. 1.

FIG. 1 plots "Figure of Merit" for an MOF. Figure of Merit is equivalent to the intensity of transmitted light divided by the sum of the intensity of transmitted light and the intensity of reflected light.

In FIG. 1, Curve 102 represents ambient light that is 1/100 the intensity of a back light (used to approximate the intensity of light from a display). Curve 104 represents ambient light that is 1/10 the intensity of a back light. Curve 106 represents ambient light intensity that is equal to the intensity of a back light. Curve 108 represents ambient light intensity that is ten times that of a back light, and curve 110 is ambient light with an intensity of 100 times that of a back light.

FIG. 1 illustrates that at angles outside the viewing angle of a MOF, the color shifting film can significantly reduce the contrast ratio or viewability of a display by mixing the display signal with the reflected ambient light. In daylight conditions, the privacy function is fairly effective, but it may provide even greater functionality when combined with an LCF, as in the film stacks described herein.

When used as a hybrid privacy filter, the film stacks described herein may employ LCFs having much higher overall transmission, including films that would, on their own, not be effective as privacy filters. For instance, so-called contrast enhancement films, which are LCFs having higher overall transmission of image light and are not as effective at blocking off-axis viewing angles, may be used in combination with an MOF to make a very effective hybrid privacy filter.

Further, in contrast to a conventional privacy filter which turns from clear to black outside the field of view, the hybrid privacy filters described herein turn from clear to red and then golden yellow as ambient light is reflected from the color shifting film at angles outside the field of view, offering an uplifting look that is colorful and vivid, and making it attractive to consumers.

The LCF used in the film stacks of the present application possess a light input surface through which light enters the film, and also a light output surface, through which the light moves towards ultimate transmission (in some embodiments of the present invention, towards and through the color shifting film). The LCF is composed of both transmissive and non-transmissive regions. The transmissive and non-transmissive regions, which alternate in order, are disposed between the light input surface and light output surface.

In some embodiments, LCFs are designed with non-transmissive regions that are absorptive regions. When the non-transmissive regions are absorptive, they may be designed so as to ensure that the absorptive regions absorb as much of the incident light as possible. This includes using an absorptive medium (e.g., carbon black), having a particle size small enough to pack the absorptive region so as to allow enough absorption to minimize light leakage. Highly absorptive regions minimize the amount of light that may leak through these regions, and therefore control the directionality and the privacy function of the LCF.

In other embodiments, it may be desirable to create non-transmissive regions that are non-black in color. Use of a light control film with non-black color absorbing regions in a hybrid privacy filter as described herein, may result in different colors appearing to off-axis viewers (that is, other than the gold and/or red viewable when the non-transmissive regions are black). For example, the use of white louvers in an LCF, may result in blue and gold regions seen by an off-axis viewer.

The LCFs used in the present description may be created by multiple processes. One useful process is skiving, further explained in U.S. patent application Re. 27,617 to Olsen. Another useful process is microreplication. One specific example of microreplication involves the following steps: (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (or substrate layer) and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. One or more of the surfaces of the base film (or substrate layer) can optionally be primed or otherwise be treated to promote adhesion of the optical layer to the base.

In embodiments wherein the non-transmissive region is absorptive, it may be desirable to minimize reflections of incident light from a display that is transmitted through the film stack. Such reflections may give rise to so-called ghost images. Such reflections may be minimized by what is known as index-matching the non-transmissive and transmissive regions of the LCF. That is, ensuring that the index of refraction of the absorptive regions relative to the transmissive regions is selected so as to minimize reflections (in particular, to minimize or eliminate total internal reflections, TIR). For instance, in some embodiments, the index of refraction of the absorptive region, N2, is selected such that, in relation to the index of refraction of the transmissive region, N1, the relationship satisfies: $|N2-N1| \leq 0.005$ As mentioned, the relative refractive indexes of absorptive and transmissive regions may be selected for the LCFs. The selection of index-matched materials may result in a reduction of ghost images produced by reflections within the LCF.

One consideration in selection of materials is that when the refractive index of the transmissive region is less than the refractive index of the absorptive region, some of the light incident to the interface between them is refracted into the absorptive region and absorbed (Fresnel relations determine how much is absorbed and reflected as a function of angle of incidence and refractive index difference, with the highest amount of reflection occurring at or near so-called grazing angles). On the other hand, the refractive indexes of the two regions can be essentially matched so that the absorptive region refractive index is slightly higher than (if not equal) to the transmissive region, and reflections are essentially eliminated In other embodiments, the brightness of a display incorporating an LCF can be increased when incident light undergoes TIR from the interface between the non-transmissive and transmissive regions. As mentioned, a drawback to this approach is that it can lead to ghosting. Whether a light ray will undergo TIR or not, can be determined from the incidence angle with the interface, and the difference in refractive index of the materials used in the transmissive and non-transmissive regions. When the refractive index of the non-transmissive region is no greater than the refractive index of the transmissive region, for instance the index of refraction of the transmissive region is greater than the index of refraction of the non-transmissive region by more than about 0.005, TIR may occur. In certain instances, TIR may be desirable. Therefore, in some cases, it may be desirable for the relationship between N2, the index of refraction of the absorptive region, and N1, the index of refraction of the transmissive region, to be such that N2−N1 is less than −0.005.

Reflections at the interface between the light transmissive region and the non-transmissive region can be controlled by mismatching the relative index of refraction of the light transmissive material and the index of refraction of the light absorbing material over at least a portion of the spectrum, for example the human visible spectrum. For instance, when N2 is greater than N1, light in the LCF is reflected, but does not undergo TIR. These reflections may also lead to higher light throughput and ghost images for light passing through the LCF. For instance, when N2−N1>0.005, light undergoes such reflections. Thus, for situations where there is index mismatching (i.e., the absolute value of N2−N1 is greater than 0.005), reflections (either TIR or Fresnel reflections) occur in the LCF.

The LCFs described herein include a plurality of non-transmissive regions. In some embodiments, the non-transmissive regions can be a plurality of channels, as shown elsewhere in the description. In some cases, the LCF can include a plurality of columns such as shown in FIG. 2b of U.S. Pat. No. 6,398,370 (Chiu et al.). In some cases, the LCF described herein can be combined with a second LCF, as also described in U.S. Pat. No. 6,398,370. In other embodiments, the non-transmissive regions are columns, posts, pyramids, cones and other structures that can add angular-dependent light transmitting or light blocking capabilities to a film.

Light absorbing materials for the non-transmissive regions in LCFs can be any suitable material, such as one that functions to absorb or block light at least in a portion of the visible spectrum. In some embodiments, the light absorbing material can be coated or otherwise provided in grooves or indentations in a light transmissive film to form light absorbing regions.

In further embodiments, light absorbing materials can include a black colorant, such as carbon black. The carbon black may be a particulate carbon black having a particle size less than 10 microns, for example 1 micron or less. The carbon black may, in some embodiments, have a mean particle size of less than 1 micron. In yet further embodiments, the absorbing material, (e.g., carbon black, another pigment or dye, or combinations thereof) can be dispersed in a suitable binder. Light absorbing materials also include particles or other scattering elements that can function to block light from being transmitted through the light absorbing regions.

In some cases, it can also be useful to define an "effective polar viewing angle" which includes light transmitted through the LCF at angles larger than the polar viewing cutoff angle. For example, light that intercepts the non-transmissive regions at angles slightly larger than the internal viewing cutoff angle can "bleed through" the thinnest portions of the non-transmissive region. Further, light traveling normal to the plane of the LCF may scatter and stray outside the effective polar viewing angle. The effective polar viewing angle as used herein is defined as the angle at which the relative brightness ratio decreases to 5% or less. The relative brightness ratio (RBR) is the ratio (expressed as a percentage) of the brightness of a diffuse light source as measured through an LCF to the brightness of the same diffuse light source as measured without the LCF. Preferably, light exits the light output surface with a maximum relative brightness ratio (RBR) in a direction perpendicular to the light output surface of 65 or greater, and exits the light output surface with an effective polar viewing angle (EPV) of 45° or less.

The LCF is composed at least partially of polymerizable resin. The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds.

The LCF may also be partially composed of a base substrate layer (element 214 in FIG. 2). Particularly useful base materials include polyethylene terephthalate (PET) and polycarbonate (PC). Other suitable substrate materials may include polyethylene naphthalate (PEN), polybutylene terephthalate (PBT), polymethyl methacrylate (PMMA), polystyrene (PS), polyetherimide (PEI), polyethylene (PE), polypropylene (PP), low-density polyethylene (LDPE), linear low-density polyethylene (LLDPE), ethylene-octene copolymer (EO), ethylene-styrene copolymer (ES), ethylene-propylene copolymer (EP), ethylene-hexene copolymer (EH), acrylonitrile butadiene styrene (ABS), tetrafluoroethylene-hexafluoropropylene-vinylidene fluoride copolymer (THV), polyurethane (PU), polyvinyl alcohol (PVA), ethylene vinyl acetetate (EVA), ethyelene-co-acrylate acid (EAA), polyamide (PA), polyvinyl chloride (PVC), polydimethylsiloxane (PDMS), poly p-phenylene sulfide (PPS), polyvinylidene fluoride (PVDF), polyether sulfone (PES) and their copolymers and blends, or glass, or other transparent substrate with visible light transmission of 50% or more. Further potentially useful materials are discussed in commonly owned PCT Application No. PCT/US08/85889.

When placed in a film stack with the color shifting films, hereafter described, the light output surface of the LCF is placed more proximate the color shifting film than the light input surface. In some embodiments the color shifting film is placed adjacent to the light output surface. In such embodiments, light enters the film stack through the light input surface of the LCF and exits the film stack through the color shifting film.

The color shifting films of the present invention are, in some embodiments, optically anisotropic multilayer polymer films that change color as a function of viewing angle. These films, which may be designed to reflect one or both polarizations of light over at least one bandwidth, can be tailored to exhibit a sharp band edge at one or both sides of at least one reflective bandwidth, thereby giving a high degree of color saturation at acute angles. The films have a large number of layers, the layers being oriented such that there are alternating layers of at least a first and second layer type, and possibly more types.

The layer thicknesses and indices of refraction of the optical stacks within the color shifting films of the present description are controlled to reflect at least one polarization of specific wavelengths of light (at a particular angle of incidence) while being transparent over other wavelengths. Through careful manipulation of these layer thicknesses and indexes of refraction along the various film axes, the films of the present invention may be made to behave as mirrors or polarizers over one or more regions of the spectrum.

In addition to their high reflectivity, the color shifting films of the present description have two non-obvious features that make them ideal for certain types of color displays. First, with particular material choices, the shape (e.g., the bandwidth and reflectivity values) of the optical transmission/reflection spectrum of the multilayer film for p-polarized light can be made to remain essentially unchanged over a wide range of angles of incidence. Because of this feature, a high efficiency mirror film having a narrow reflection band at, for example, 650 nm will appear deep red in reflection at normal incidence, then red, yellow, green, and blue at successively higher angles of incidence. Such behavior is analogous to moving a color dispersed beam of light across a slit in a spectrophotometer. Indeed, the films of the present invention may be used to make a simple spectrophotometer. Secondly, the color shift with angle is typically greater than that of conventional isotropic multilayer films.

Preferably, the color shifting film will have at least one transmission band in the visible region of the spectrum. The maximum transmission of this transmission band will preferably be at least approximately 70%. The transmission band at normal incidence preferably will vary by less than about 25 nm over a surface area of the film of at least 6 $cm^2$. The movement of variously shaped reflection bands across the spectrum as the angle of incidence is varied is the primary basis for the color change of the film as a function of viewing angle, and may be used advantageously to create a number of interesting articles and effects as are described herein. Many combinations of transmissive and reflective colors are possible.

A variety of polymer materials suitable for use in the present invention have been taught for use in making coextruded multilayer optical films. Particularly useful materials and methods for choosing appropriate materials for the color shifting film of the present invention may be hardening polymers, for example, a repeating monomer unit derived from a methacrylate. A more complete list of potential materials may be found in U.S. Pat. No. 6,531,230 to Weber et al., incorporated herein by reference.

The making of such color shifting films may also be found in the incorporated U.S. Pat. No. 6,531,230 to Weber et al.

Other suitable color shifting films include multilayer films generated by spin coating, blade coating, dip coating, evaporation, sputtering, chemical vapor deposition (CVD), and the like. Exemplary films include both organic and inorganic materials. Such films are described, for instance, in U.S. Pat. Nos. 7,140,741; 7,486,019; and 7,018,713.

In particular embodiments, in order to create the hybrid privacy filter stack which includes the color shifting film and the light control film, the two layers are proximate to one another. As used herein, "proximate" to one another means that the films are either in contact with one another or, if they are separated, the material interspersed between them does not impart any optical functionality to the film stack.

In some embodiments, the LCF and color shifting film may be adhered together through use of an adhesive (e.g., element 206 in FIG. 2). An adhesive layer may therefore be located between the color shifting film and the light control film.

The adhesive may be partially opaque or optically clear, but will preferably be optically clear (or transparent) so as to not impede light transmission through the film stack.

The adhesive may be cured by any number of suitable methods, such as radiation. One particularly suitable method is curing by ultraviolet radiation.

Appropriate adhesives for use in the present invention may also be pressure-sensitive adhesives. Particularly useful adhesives may include transfer adhesives, or those that are applied by laminating. A useful laminating process is described in commonly owned PCT Application No. PCT/US08/85889.

The film stacks described herein are particularly useful as a component of a display device as a so-called hybrid privacy filter. The hybrid privacy filter may be used in conjunction with a display surface, wherein light enters the hybrid privacy filter on the input side of the light control film and exits the hybrid privacy filter or film stack at the color shifting film.

A great number of electronic devices with displays may be used in conjunction with the present invention including laptop monitors, external computer monitors, cell phone displays, televisions, PDAs, smart phones, consoles, or any other similar plasma or LCD based display. Other types of backlit display imaging devices are also contemplated, including non-electronic displays such as sunglasses, document coversheets, windows and any number of others.

In further embodiments, the film stacks described herein may be useful as coverings for glass. For instance, the film stacks may be laminated onto or within fenestrations. The fenestrations may be selected from a glass panel, a window, a door, a wall, and a skylight unit. These fenestrations may be located on the outside of a building or on the interior. They may also be car windows, airplane passenger windows, or the like. Advantages of incorporating these film stacks into fenestrations include reduced IR transmission (which may lead to increased energy savings), ambient light blocking, privacy, and decorative effects.

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification. The foregoing description can be better understood by consideration of the embodiments shown by the testing results and examples that follow.

EXAMPLES

Example 1:

A hybrid privacy filter based on a laminate film stack incorporating one type of light control film called Advanced Light Control Film (ALCF), and a multilayer color shifting film was prepared. The light control film was a louver film created by microreplication. The color shifting film had 450 layers and transmission band from 350 nm to 650 nm at normal incident angle. The construction and method of making the color shifting film was described in U.S. Pat. No. 6,531,230 (color shifting film) to Weber et al.

The color shifting film reflected incident light from 650 nm to 1200 nm at normal angle. The light control film was composed of both transmission regions and absorption regions that were disposed on a base substrate. One sheet of color shifting film and one sheet of louver film (as described in commonly owned PCT Application No. PCT/US08/85889) were laminated together using a UV curable adhesive (UVX4856 available from 3M Company, Saint Paul, Minn.) on a laminator. The louver film was built on a 170 μm polycarbonate substrate. The laminate was subsequently UV cured in an oven.

Observation was made to compare the above hybrid with a typical ALCF louver film based privacy filter under an ambient light intensity of 600 lux at the front surface of a color display. The ALCF louver film remained clear inside its designed field of view, then turned from clear to black when viewed outside the field of view. In contrast to conventional privacy filter, the hybrid privacy filter turned from clear to red and then golden yellow as it reflected the ambient light outside the field of view, offering an uplifting look that was colorful and vivid. The privacy function of the two was tested and results are presented in the following Table 1.

TABLE 1

| Angle from Normal, degree | ALCF alone | ALCF + MOF |
| --- | --- | --- |
| 0 | ○ | ○ |
| 5 | ○ | ○ |
| 10 | ○ | ○ |
| 15 | ○ | ○ |
| 20 | ○ | ○ |
| 25 | Δ | Δ |
| 30 | Δ | ■ |
| 35 | ■ | ■ |
| 40 | ■ | X |
| 45 | ■ | X |
| 50 | ■ | X |
| 55 | ■ | X |
| 60 | ■ | X |
| 65 | X | X |
| 70 | X | X |
| 75 | X | X |
| 80 | X | X |
| 85 | X | X |
| 90 | X | X |

Visual Privacy Level Inspection
○: Good visibility, no privacy (>50% peak brightness of normal angle)
Δ: Some impeded visibility, some privacy (<20% peak brightness of normal angle)
■: Severely impeded visibility, effective privacy (<5% peak brightness of normal angle)
X: Total invisibility, complete privacy As is clear from this example, the color shifting effect in combination with the light control film enhanced the viewing angle cut-off and privacy function. The effect was exemplified in the difference, illustrated in FIG. 2 as FOV' and FOV. This greater privacy occurred while maintaining the same level of high overall transmission. With particular regard to the viewing angle cut-off and privacy function, the hybrid privacy filter of Example 1 reached effective privacy function at an angle of about 5 degrees less than an ALCF alone. In addition, the hybrid filter reached complete privacy (0% visibility of display information) at 35 degree angle whereas the ALCF alone did not achieve the same level of complete privacy until about 60 degrees. This example demonstrated that a hybrid privacy filter comprising an ALCF louver film and a color shifting film has an enhanced privacy function over an ALCF privacy filter alone.

Example 2:

The second example included a hybrid privacy filter that was made based on the same lamination process as Example 1, except that the ALCF louver film was replaced by a different louver film called a contrast enhancement film (CEF) which has a wider view angle. This hybrid filter was compared with the stand alone louver film based privacy filter (CEF) for privacy function and color in the same typical ambient light condition as in Example 1. The stand-alone CEF privacy filter remained clear inside of its designed filed of view, and then it turned from transparent to a darkened image (severely impeded, but not total invisibility) when viewed outside its designed field of view. The hybrid privacy filter turned from transparent to red and then golden yellow as it reflects the ambient light outside the field of view. The privacy function was visually inspected at different viewing angles. Comparative results follow in Table 2.

TABLE 2

| Angle from Normal, degree | CEF alone | CEF + MOF |
| --- | --- | --- |
| 0 | ○ | ○ |
| 5 | ○ | ○ |
| 10 | ○ | ○ |
| 15 | ○ | ○ |
| 20 | ○ | ○ |
| 25 | ○ | ○ |
| 30 | ○ | ○ |
| 35 | ○ | Δ |
| 40 | Δ | ■ |
| 45 | Δ | X |
| 50 | ■ | X |
| 55 | ■ | X |
| 60 | ■ | X |
| 65 | ■ | X |
| 70 | ■ | X |
| 75 | ■ | X |
| 80 | ■ | X |
| 85 | ■ | X |
| 90 | ■ | X |

Visual Privacy Level Inspection
○: Good visibility, no privacy (>50% peak brightness of normal angle)
Δ: Some impeded visibility, some privacy (<20% peak brightness of normal angle)
■: Severely impeded visibility, effective privacy (<5% peak brightness of normal angle)
X: Total invisibility, complete privacy As can be noted from the preceding table, under typical lighting condition, the hybrid filter showed enhanced privacy function compared to the stand alone CEF in Example 2. Specifically, the hybrid privacy filter reaches effective privacy function at 10 degrees sooner than stand alone CEF. In addition, hybrid filter reaches complete privacy (0% visibility of display information) at a 45 degree angle, whereas stand alone CEF did not achieve the same level of complete privacy. This example demonstrated that a hybrid privacy filter comprising a CEF louver film and a color shifting film had a narrower field of view and an enhanced privacy function over stand alone CEF privacy filter.

Example 3:

A third example made use of another hybrid privacy filter that was based on the same lamination process as in Example 1, except the ALCF louver film was replaced by a different louver film which was made by a skiving process (SLCF).

Here the stand alone skived louver filter turned from transparent to darker (and eventually to black) once outside the field of view. The hybrid privacy filters turned from transparent to red and then golden yellow as it reflected ambient light outside the field of view. The privacy function was visually inspected at different viewing angles. Comparative results follow in Table 3.

TABLE 3

| Angle from Normal, degree | SLCF alone | SLCF + MOF |
|---|---|---|
| 0 | ○ | ○ |
| 5 | ○ | ○ |
| 10 | ○ | ○ |
| 15 | ○ | ○ |
| 20 | ○ | ○ |
| 25 | ○ | ○ |
| 30 | Δ | Δ |
| 35 | ■ | X |
| 40 | ■ | X |
| 45 | ■ | X |
| 50 | ■ | X |
| 55 | ■ | X |
| 60 | ■ | X |
| 65 | X | X |
| 70 | X | X |
| 75 | X | X |
| 80 | X | X |
| 85 | X | X |
| 90 | X | X |

Visual Privacy Level Inspection
○: Good visibility, no privacy (>50% peak brightness of normal angle)
Δ: Some impeded visibility, some privacy (<20% peak brightness of normal angle)
■: Severely impeded visibility, effective privacy (<5% peak brightness of normal angle)
X: Total invisibility, complete privacy As can be noted from the preceding table, under typical lighting condition, the hybrid filter showed enhanced privacy function compared to the stand alone skived louver film. Specifically, the hybrid filter reached complete privacy (0% visibility of display information) at a 35 degree angle whereas the stand alone skived louver filter reached the same level of complete privacy at about 65 degrees. This example demonstrated that a hybrid privacy filter comprising a skived louver film and a color shifting film had enhanced privacy function over stand alone skived privacy filter.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

We claim:

1. A film stack comprising:
a light control film; and
a color shifting film,
wherein the light control film comprises a light input surface and a light output surface, and alternating transmissive and absorptive regions disposed between the light input surface and the light output surface, and wherein light incident to the light input surface exits the film stack with an effective polar viewing angle (EPV) of 45° or less.

2. The film stack of claim 1, further comprising an adhesive layer between the light control film and color shifting film.

3. The film stack of claim 1, wherein the light control film comprises a plurality of non-transmissive regions.

4. The film stack of claim 3, wherein the non-transmissive regions comprise carbon black.

5. The film stack of claim 3, wherein the non-transmissive regions comprise a non-black colored material.

6. The film stack of claim 1, wherein the light control film is selected from a skived film and a microreplicated film.

7. The film stack of claim 1, wherein the color shifting film comprises multilayer optical film.

8. The film stack of claim 1, wherein the color shifting film comprises alternating layers of at least a first and second layer type.

9. The film stack of claim 8 wherein at least one of the alternating layers comprises an inorganic material.

10. The films stack of claim 8, wherein the first layer type comprises a hardening polymer.

11. The film stack of claim 10, wherein the polymer comprises a repeating monomer unit derived from a methacrylate.

12. The film stack of claim 1, wherein the color shifting film has at least one transmission band in the visible region of the electromagnetic spectrum with a maximum transmission of at least about 70%.

13. The film stack of claim 1, wherein each transmissive region has an index of refraction N1, and each absorptive region has an index of refraction N2, where the absolute value of (N2−N1) is less than or equal to 0.005.

14. The film stack of claim 1, wherein each transmissive region has an index of refraction N1, and each absorptive region has an index of refraction N2, where the absolute value of (N2−N1) is greater than 0.005.

15. The film stack of claim 1, wherein the light output surface is adjacent to the color shifting film.

16. A structure comprising a fenestration and the film stack of claim 1.

17. The structure of claim 16 wherein the fenestration is selected from a glass panel, a window, a door, a wall, and a skylight unit.

18. The structure of claim 17 wherein the fenestration is located on the exterior of a building.

19. The film stack of claim 1 wherein the color shifting film is proximate to the light control film.

* * * * *